United States Patent
Berman

(10) Patent No.: US 7,280,281 B2
(45) Date of Patent: Oct. 9, 2007

(54) METHOD AND APPARATUS FOR INCREASING MICRODISPLAY BLACK STATE IN LIGHT MANAGEMENT SYSTEMS AND FLEXIBILITY TO UTILIZE POLARIZED OR UNPOLARIZED INPUT LIGHT

(75) Inventor: Arthur Berman, San Jose, CA (US)

(73) Assignee: Berg & Berg Enterprises, Inc., Cupertino, CA (US)

( * ) Notice: Subject to any disclaimer, the term of this patent is extended or adjusted under 35 U.S.C. 154(b) by 507 days.

(21) Appl. No.: 10/382,766

(22) Filed: Mar. 5, 2003

(65) Prior Publication Data

US 2004/0008418 A1  Jan. 15, 2004

Related U.S. Application Data

(60) Provisional application No. 60/370,533, filed on Apr. 4, 2002, provisional application No. 60/365,008, filed on Mar. 13, 2002, provisional application No. 60/362,260, filed on Mar. 5, 2002.

(51) Int. Cl.
*G02B 27/10* (2006.01)
*G02B 27/14* (2006.01)

(52) U.S. Cl. .................... 359/627; 359/634
(58) Field of Classification Search ........ 359/242, 359/259, 267, 618, 629, 634, 636, 638, 640, 359/627; 348/751, 752, 757; 345/38, 40, 345/42, 87; 349/5, 8, 9, 62, 76; 353/33, 353/39, 81; 324/770
See application file for complete search history.

(56) References Cited

U.S. PATENT DOCUMENTS

| | | | |
|---|---|---|---|
| 1,277,040 A | | 8/1918 | Brewster |
| 3,957,348 A | * | 5/1976 | Saeva .......................... 349/98 |
| 4,127,322 A | * | 11/1978 | Jacobson et al. ............. 353/31 |
| 4,151,554 A | | 4/1979 | Tucker |
| 4,544,237 A | | 10/1985 | Gagnon |

(Continued)

FOREIGN PATENT DOCUMENTS

JP  54-155153  6/1981

(Continued)

OTHER PUBLICATIONS

Robinson et al., (2000) "High Contrast Color Splitting Architecture Using Polarization Filters," *SID '00 Digest*, vol. 31.

(Continued)

*Primary Examiner*—Hung Xuan Dang
*Assistant Examiner*—Tuyen Tra
(74) *Attorney, Agent, or Firm*—Martine Penilla & Gencarella, LLP

(57) ABSTRACT

A dichroic is positioned to separate color beams of polarized input light. The color beams are directed to microdisplays that contain correspondingly colored content in a kernel of a Light Management System (LMS). Adjustment of a voltage amplitude of the microdisplays is set to produce a maximum black state of the LMS. In one embodiment, a passive nematic liquid crystal device is utilized as a quarter waveplate. A thickness of a liquid crystal layer (d) is matched to a birefringence ($\Delta n$) of the nematic such that retardation $d\Delta n = \frac{1}{4}\lambda$.

25 Claims, 8 Drawing Sheets

U.S. PATENT DOCUMENTS

| | | | |
|---|---|---|---|
| 4,913,528 A | 4/1990 | Hasegawa | |
| 5,168,351 A | 12/1992 | Bradley | |
| 5,177,629 A | 1/1993 | Bohannon | |
| 5,497,268 A | 3/1996 | Tang | |
| 5,552,922 A | 9/1996 | Magarill | |
| 5,838,397 A | 11/1998 | Stephens | |
| 5,865,520 A | 2/1999 | Kavanagh et al. | |
| 5,986,814 A | 11/1999 | Reinsch | |
| 6,046,716 A * | 4/2000 | McKnight | 345/95 |
| 6,046,858 A | 4/2000 | Scott et al. | |
| 6,056,407 A | 5/2000 | Iinuma et al. | |
| 6,089,719 A | 7/2000 | Lin | |
| 6,115,484 A | 9/2000 | Bowker et al. | |
| 6,139,154 A | 10/2000 | Haba | |
| 6,175,400 B1 * | 1/2001 | Duncan et al. | 349/117 |
| 6,176,586 B1 | 1/2001 | Hirose et al. | |
| 6,183,090 B1 | 2/2001 | Nakanishi et al. | |
| 6,183,091 B1 | 2/2001 | Johnson et al. | |
| 6,247,814 B1 | 6/2001 | Lin | |
| 6,262,851 B1 * | 7/2001 | Marshall | 359/634 |
| 6,280,037 B1 | 8/2001 | Smith | |
| 6,288,844 B1 | 9/2001 | Edlinger et al. | |
| 6,304,302 B1 | 10/2001 | Huang et al. | |
| 6,309,071 B1 | 10/2001 | Huang et al. | |
| 6,343,864 B1 * | 2/2002 | Tajiri | 353/20 |
| 6,364,488 B1 | 4/2002 | Lin | |
| 6,366,335 B1 | 4/2002 | Hikmet et al. | |
| 6,375,330 B1 | 4/2002 | Mihalakis | |
| 6,377,318 B1 | 4/2002 | Menard | |
| 6,406,151 B1 | 6/2002 | Fujimori | |
| 6,407,868 B1 | 6/2002 | Ishibashi et al. | |
| 6,415,093 B1 | 7/2002 | Nakamura et al. | |
| 6,419,362 B1 | 7/2002 | Ikeda et al. | |
| 6,454,416 B2 | 9/2002 | Aoto et al. | |
| 6,476,972 B2 | 11/2002 | Edlinger et al. | |
| 6,490,087 B1 | 12/2002 | Fulkerson et al. | |
| 6,509,938 B2 | 1/2003 | Okada et al. | |
| 6,522,470 B2 | 2/2003 | De Vaan et al. | |
| 6,530,663 B2 | 3/2003 | Lin | |
| 6,626,540 B2 * | 9/2003 | Ouchi et al. | 353/31 |
| 6,638,582 B1 * | 10/2003 | Uchiyama et al. | 428/1.2 |
| 6,717,706 B2 | 4/2004 | Miller et al. | |
| 2001/0024556 A1 | 9/2001 | Beguin et al. | |
| 2002/0001135 A1 * | 1/2002 | Berman et al. | 359/640 |
| 2002/0109820 A1 | 8/2002 | Pan | |
| 2002/0140905 A1 | 10/2002 | Ouchi et al. | |
| 2002/0176054 A1 | 11/2002 | Mihalakis | |
| 2003/0103171 A1 | 6/2003 | Hall, Jr. et al. | |
| 2003/0117593 A1 | 6/2003 | Abe et al. | |
| 2003/0147051 A1 | 8/2003 | Fujita et al. | |

FOREIGN PATENT DOCUMENTS

| | | |
|---|---|---|
| JP | 04-005428 | 7/1993 |
| JP | 04-031676 | 9/1993 |
| JP | 04-151008 | 12/1993 |
| JP | 07-041358 | 8/1996 |
| WO | WO 0204994 A2 * | 1/2002 |

OTHER PUBLICATIONS

International Search Report for PCT/US04/09693 dated Nov. 26, 2004.

* cited by examiner

| CONFIGURATION NUMBER | INPUT ORIENTATION | FACE 1 | FACE 2 | FACE 3 | FACE 4 |
|---|---|---|---|---|---|
| 1 | Right angle | Blue | Red | Green | - |
| 2 | Right angle | Blue | Red | - | Green |
| 3 | Right angle | Blue | Green | Red | - |
| 4 | Right angle | Blue | Green | - | Red |
| 5 | Right angle | Blue | - | Red | Green |
| 6 | Right angle | Blue | - | Green | Red |
| 7 | Right angle | Red | Blue | Green | - |
| 8 | Right angle | Red | Blue | - | Green |
| 9 | Right angle | Red | Green | Blue | - |
| 10 | Right angle | Red | Green | - | Blue |
| 11 | Right angle | Red | - | Green | Blue |
| 12 | Right angle | Red | - | Blue | Green |
| 13 | Right angle | Green | Red | Blue | - |
| 14 | Right angle | Green | Red | - | Blue |
| 15 | Right angle | Green | Blue | Red | - |
| 16 | Right angle | Green | Blue | - | Red |
| 17 | Right angle | Green | - | Red | Blue |
| 18 | Right angle | Green | - | Blue | Red |
| 19 | Right angle | - | Blue | Red | Green |
| 20 | Right angle | - | Blue | Green | Red |
| 21 | Right angle | - | Red | Blue | Green |
| 22 | Right angle | - | Red | Green | Blue |
| 23 | Right angle | - | Green | Blue | Red |
| 24 | Right angle | - | Green | Red | Blue |
| 25 | Straight through | Blue | Red | Green | - |
| 26 | Straight through | Blue | Red | - | Green |
| 27 | Straight through | Blue | Green | Red | - |
| 28 | Straight through | Blue | Green | - | Red |
| 29 | Straight through | Blue | - | Red | Green |
| 30 | Straight through | Blue | - | Green | Red |
| 31 | Straight through | Red | Blue | Green | - |
| 32 | Straight through | Red | Blue | - | Green |
| 33 | Straight through | Red | Green | Blue | - |
| 34 | Straight through | Red | Green | - | Blue |
| 35 | Straight through | Red | - | Green | Blue |
| 36 | Straight through | Red | - | Blue | Green |
| 37 | Straight through | Green | Red | Blue | - |
| 38 | Straight through | Green | Red | - | Blue |
| 39 | Straight through | Green | Blue | Red | - |
| 40 | Straight through | Green | Blue | - | Red |
| 41 | Straight through | Green | - | Red | Blue |
| 42 | Straight through | Green | - | Blue | Red |
| 43 | Straight through | - | Blue | Red | Green |
| 44 | Straight through | - | Blue | Green | Red |
| 45 | Straight through | - | Red | Blue | Green |
| 46 | Straight through | - | Red | Green | Blue |
| 47 | Straight through | - | Green | Blue | Red |
| 48 | Straight through | - | Green | Red | Blue |

FIG. 10

METHOD AND APPARATUS FOR INCREASING MICRODISPLAY BLACK STATE IN LIGHT MANAGEMENT SYSTEMS AND FLEXIBILITY TO UTILIZE POLARIZED OR UNPOLARIZED INPUT LIGHT

CROSS REFERENCE TO RELATED APPLICATIONS AND CLAIM OF PRIORITY

This invention claims priority to the following co-pending U.S. provisional patent applications, which are incorporated herein by reference, in its entirety:

Berman (I), U.S. Provisional Patent Application Ser. No. 60/362,260, entitled "Means, Suitable for use in High Volume Manufacturing, for Optimizing the Application of a Waveplate Between the Microdisplay and the Prism Assembly of an LCoS Based Video Projection System,", filed Mar. 5, 2002;

Berman (II), U.S. Provisional Patent Application Ser. No. 60/365,008, entitled "Use of a Passive Nematic Cell to Compensate Residual Retardation in the Microdisplay of a LCoS Based Video Projector,", filed Mar. 13, 2002; and Berman (III), U.S. Provisional Patent Application Ser. No. 60/370,533, entitled "LCoS Kernel that, with Modification, can Accept the Input of Either Polarized or Unpolarized Light,"filed Apr. 4, 2002.

This invention also claims priority to the following co-pending U.S. patent application, which is incorporated herein by reference, in its entirety:

Berman et al. (I), U.S. patent application Ser. No. 10/342,219, entitled "Design of Prism Assemblies and Kernel Configurations for Use in Projection Systems,"filed Jan. 13, 2003.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of Invention

The invention relates to Light Management Systems (LMSs). The invention is more particularly related to improvements to LMS and their applications to reflective microdisplay based video projectors. The invention is yet further related to utilization of polarized light as an input to a kernel of an LMS and also related to increasing image contrast, black state darkness, and brightness of an LMS using passive nematic cells, waveplates, and devices arranged as described herein.

2. Discussion of Background

Light Management Systems (LMSs) are utilized in optical devices, particularly projection video devices and generally comprises a light source, condenser, kernel, projection lens, and a display screen, and related electronics. The function of the components of a video projector 100 is explained with reference to FIG. 1. As shown, white light 110 is generated by a light source 105. The light is collected, homogenized and formed into the proper shape by a condenser 115. UV and IR components are eliminated by filters (e.g., hot/cold mirrors 116/117). The white light 110 then enters a prism assembly 150 where it is polarized and broken into red, green and blue polarized light beams. A set of reflective microdisplays 152A, 152B, and 152C are provided and positioned to correspond to each of the polarized light beams (the prism assembly 150 with the attached microdisplays is called a kernel). The beams then follow different paths within the prism assembly 150 such that each beam is directed to a specific reflective microdisplay. The microdisplay that interacts with (reflects) the green beam displays the green content of a full color video image. The reflected green beam then contains the green content of the full color video image. Similarly for the blue and red microdisplays. On a pixel by pixel basis, the microdisplays modulate and then reflect the colored light beams. The prism assembly 150 then recombines the modulated beams into a modulated white light beam 160 that contains the full color video image. The resultant modulated white light beam 160 then exits the prism assembly 150 and enters a projection lens 165. Finally, the image-containing beam (white light beam 160 has been modulated and now contains the full color image) is projected onto a screen 170.

A number of prism assemblies are commercially available. In most, the configuration of the prism assembly consists of precisely formed optical components that have been bonded together. The specific construction techniques by which this is accomplished provides differing advantages and disadvantages, and the components and arrangements of components within the prism assemblies vary according to their designs.

One challenge in designing a light engine is to produce an image with the blackest possible dark state. One of the means by which this can be accomplished is to insert quarter waveplates between the microdisplays and the faces of the prism. One function of the waveplate is to compensate the residual birefringence that exists in the high voltage (dark) state of the microdisplay.

To obtain the blackest possible dark state, the conventional procedure is as follows:

The retardation values of the quarter waveplates should be matched to the center of the light spectrum of each channel. For example, the retardation of the waveplate in the red channel might be centered at 150 nm, the green at 135 nm and the blue at 110 nm.

The highest available voltage is applied to all three microdisplays. (this produces the lowest possible value of residual retardation.)

Each waveplate is cut into an "oversized" rectangular piece in which its principle retardation axes are oriented parallel and perpendicular to the edges. The "red" waveplate is placed between the "red" microdisplay and the prism. With the voltage applied to the red microdisplay, the red waveplate is rotated to the angle that produces the blackest dark state in red channel ("tuning" the waveplate). The same procedure is then applied to the green and the blue channels.

Note that the use of "tuned" waveplates is desirable in that they produce the blackest possible dark state. Tuned waveplates are not, however, strictly required. It is possible to use waveplates having arbitrary values in the visible spectra. The axis angle required to obtain the blackest possible dark state with an arbitrary waveplate will, in general, be different from that required for a tuned waveplate. More importantly, although the blackness of the dark state obtained for the arbitrary waveplate can be optimized it will not, in general, be as black as that obtained with a tuned waveplate. However, the blackness difference is likely to be small.

Thus, in the conventional procedure to obtain the blackest possible dark state, the compensating retardation of the waveplate is varied to match the fixed residual retardation of the microdisplay. In theory, this procedure works quite well. In reality, when evaluated for use in a high volume manufacturing environment, the process is found to be difficult, time consuming and expensive to implement.

In addition, in an actual high-volume manufacturing environment, it is found that there are major difficulties in accomplishing proper insertion of the waveplate. These difficulties relate to the physical properties of the quarter waveplate material.

Some waveplates are not flat. This is often the case when the waveplate material is "thick". If the material is not flat, distortion can be introduced into the focus of the image. In addition, proper lamination of the waveplate (as is required in some configurations) is difficult to accomplish.

Some waveplates are too flexible. This is the case when the waveplate material is too thin, almost like cellophane. Such a material cannot be easily manipulated during the assembly process.

In both the thick and thin varieties of waveplate, it is difficult to obtain materials that are defect free. This is particularly important in that the waveplate is close to the focal plane of the microdisplay. Any defects in the waveplate will almost certainly be in focus and visible in the projected image.

An additional difficulty is that the best commercially available waveplate materials are prohibitively expensive (expensive being defined in the context of a kernel application).

Some light engines are designed to produce polarized light and utilize a kernel that requires the input of polarized light. Other light engines are designed to produce unpolarized light and utilize a kernel that requires the input of unpolarized light.

SUMMARY OF THE INVENTION

The present inventors have realized the need for design of light engines that can accept either polarized or unpolarized light and do so without unacceptable light loss. In one embodiment, the present invention is a kernel, comprising, an input face configured to receive input polarized light, and a beam separating dichroic arranged on a diagonal to the input polarized light and configured to separate the input polarized light into a first color beam and a second color beam.

The present inventors have also realized the need to manufacture, in large quantities, LCoS based devices that can produce the blackest dark state of the microdisplays. In one embodiment, the present invention provides a method for adjustment of a voltage amplitude of the microdisplays to be set to produce a maximum black state of the LMS in a manner that is cost effective for large scale production. Portions of both the method may be conveniently implemented in programming on a specialized or general purpose computer programmed according to the present invention (such programming may be stored on computer readable media, such as magnetic/optical disks, memory, etc.). The invention also includes the use of passive nematic cells as waveplates within a kernel.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 10 is a tabular listing of kernel configurations applicable to the present invention.

DESCRIPTION OF THE PREFERRED EMBODIMENTS

Figure 1:
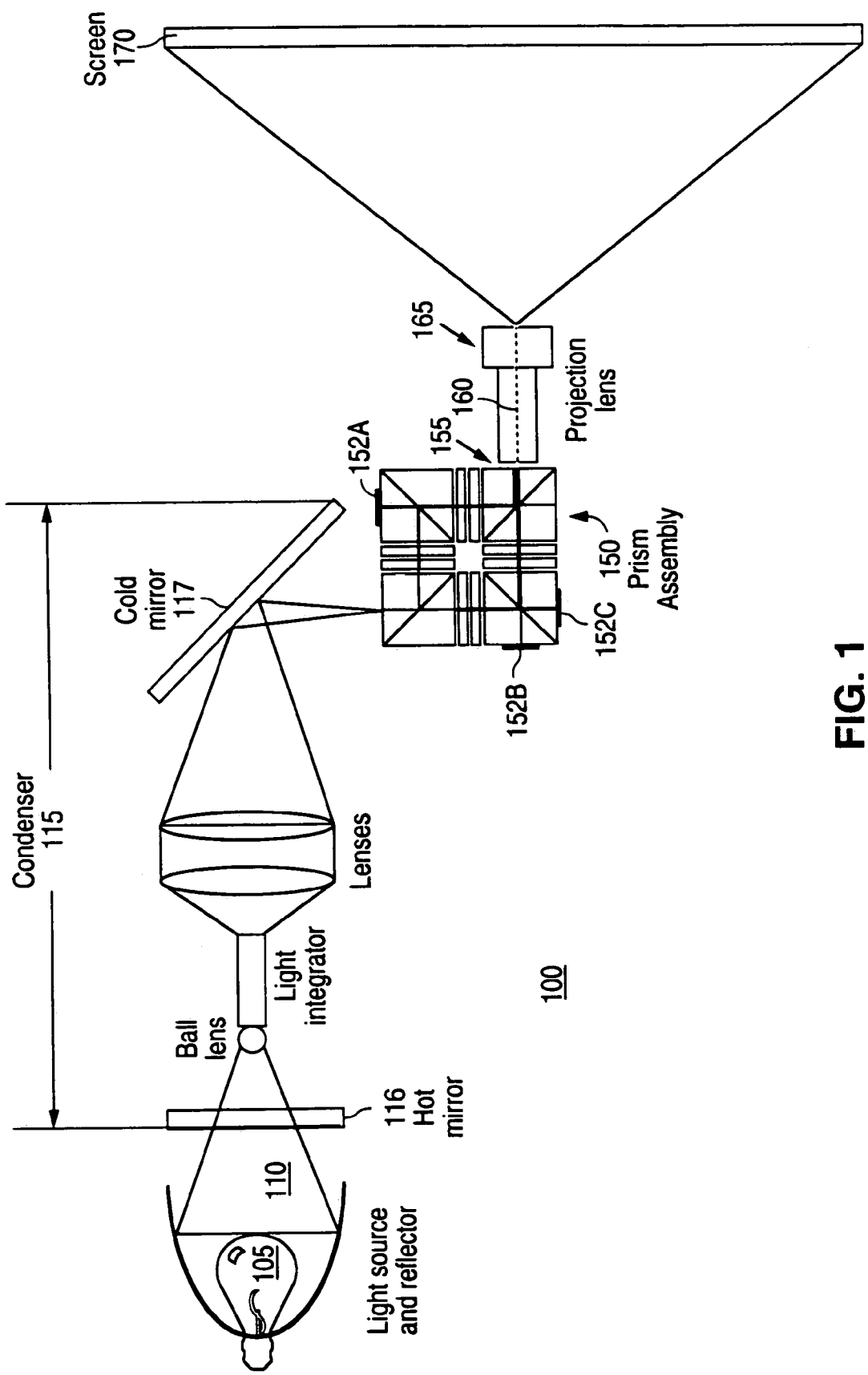
FIG. 1 is a drawing of a Light Management System (LMS) video projector.
Figure 2:
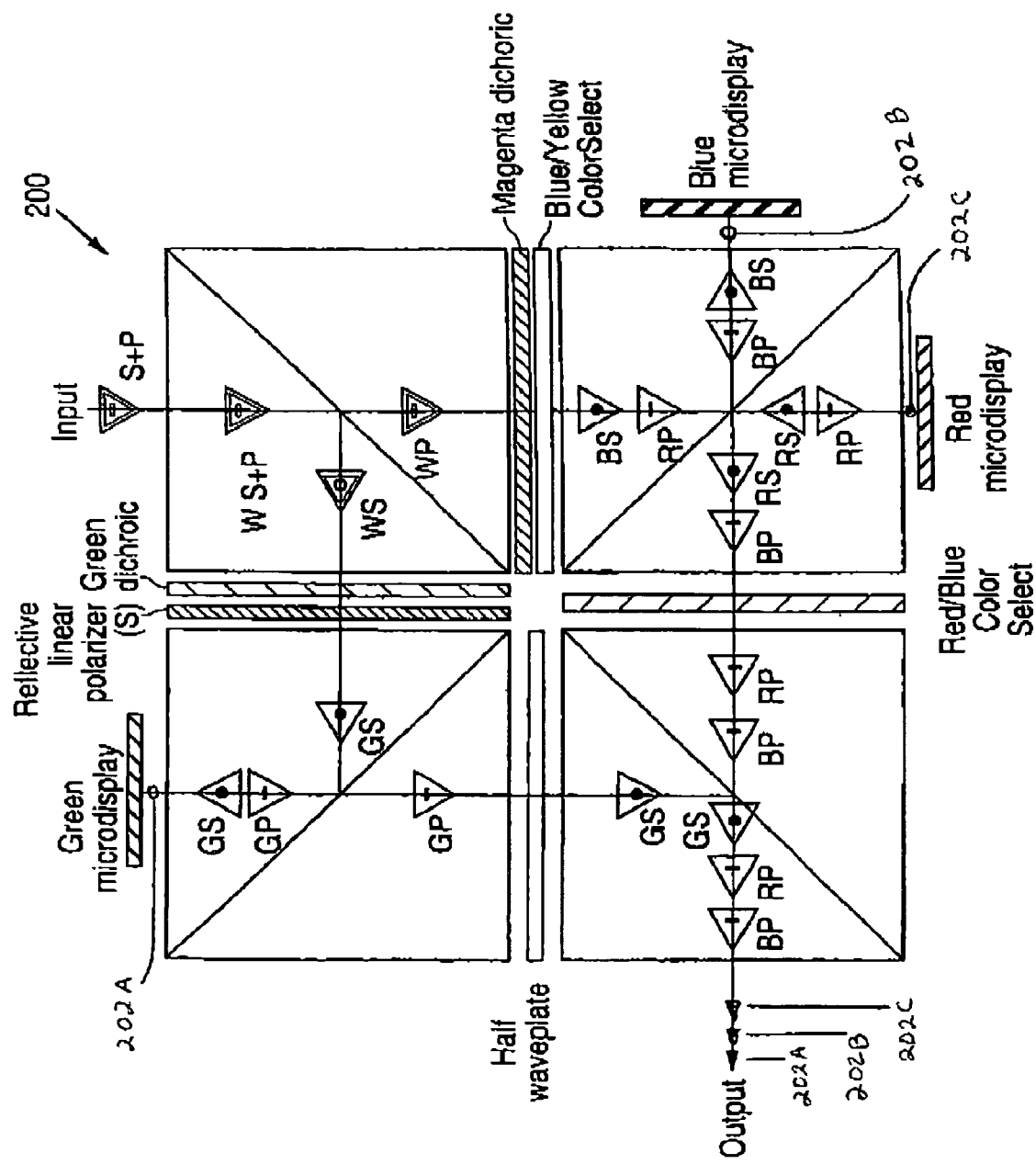
FIG. 2 is a drawing of an example kernel illustrating lightpaths and components of one possible configuration of a prism assembly.

Referring again to the drawings, wherein like reference numerals designate identical or corresponding parts, and more particularly to FIG. 2 thereof, there is illustrated a kernel configuration that requires the input of unpolarized light. The problem is, then, to conceive a cost effective modification to the LMS kernel that allows it to operate in a light engine that produces polarized light and to do so without additional light loss.

Figure 3:
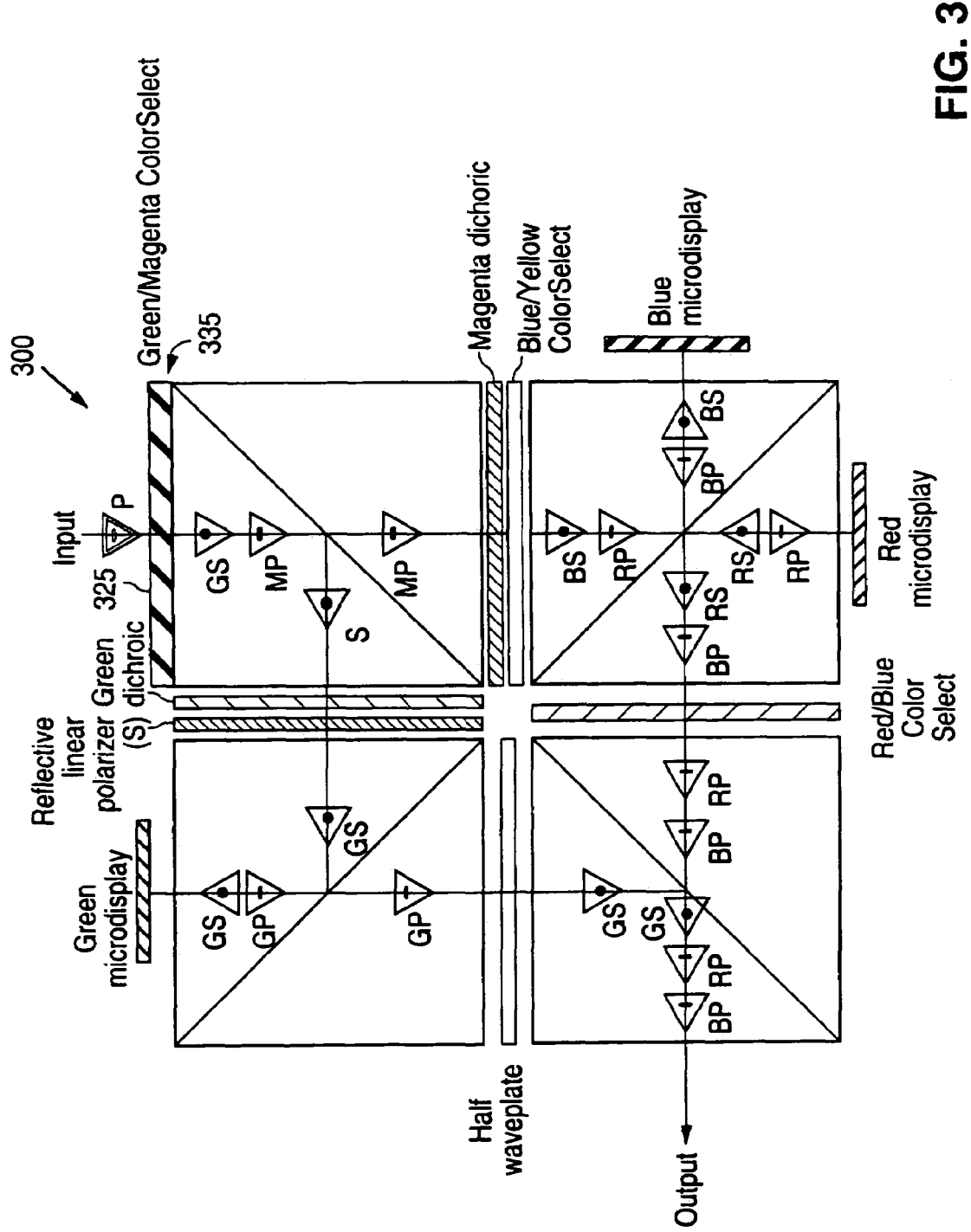
FIG. 3 is drawing illustrating a construction technique of an LMS prism assembly according to an embodiment of the present invention.

In one embodiment, the invention is a means that allows an LMS kernel to operate in a light engine that produces polarized light and to do so without unacceptable light loss. For example, an implementation of the invention is disclosed in FIG. 3. Note that the modification to the original kernel configuration 200 presented in FIG. 2 is the addition of a green/magenta ColorSelect wavelength specific retarder 325 at an input face 335 of the prism assembly of kernel 300. The paths, colors and polarizations of the light traveling through the modified kernel are also indicated in FIG. 2.

Figure 4:
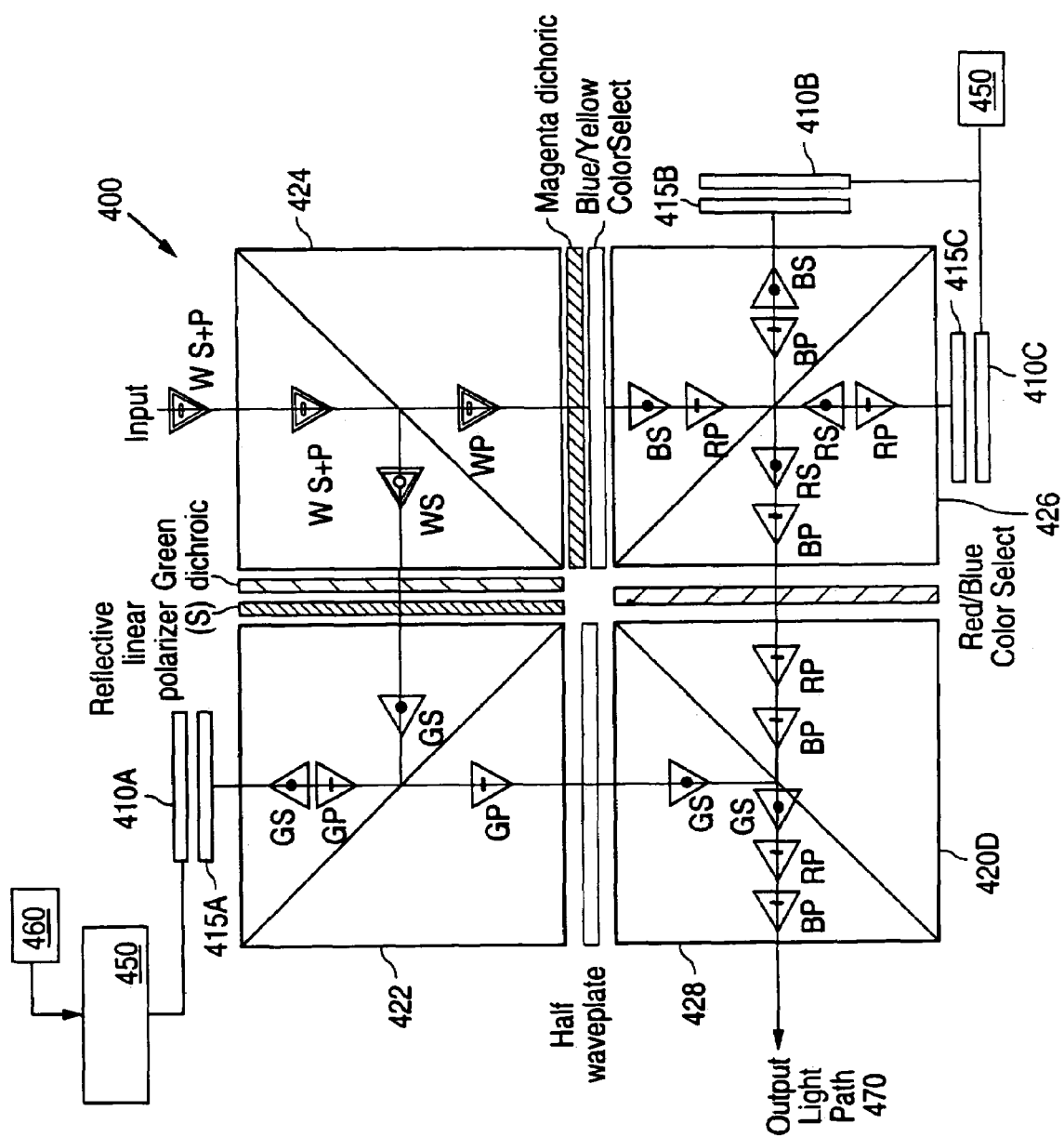
FIG. 4 is a drawing of a kernel according to another embodiment of the present invention.

In one embodiment, the present invention optimizes the application of waveplates between the microdisplays and the prism assembly being accomplished in the context of a high volume manufacturing environment. FIG. 4 illustrates a set of microdisplays 410A (Green), 410B (Blue), and 410C (Red) utilized in an LCoS based kernel 400. The kernel 400 includes optical components (beam splitters) 422, 424, 426, and 428. Between the optical components and each microdisplay is a waveplate (e.g., waveplates 415A, 415B, and 415C). The waveplates have retardation values matched to approximately the center of the spectrum in each channel. For example, waveplate 415A is centered in the green channel, 415B centered in the blue channel, and 415C centered in the red channel.

The waveplates are cut into rectangular pieces the size of the microdisplay in which the axes are oriented at an angle to the edges. The nominal value of the angle will be unique to each type of microdisplay, drive condition and color channel. Blue has the smallest angle and red the largest. In all cases the angles are usually small, a few degrees. The nominal angles are determined experimentally in a procedure that is separate and apart from the manufactured process.

The "red" waveplate 415C is coupled to the "red" microdisplay 410C, the "blue" waveplate 415B is coupled to the "blue" microdisplay 410B, and the "green" waveplate 415A is coupled to the "green" microdisplay 410A.

Figure 5:
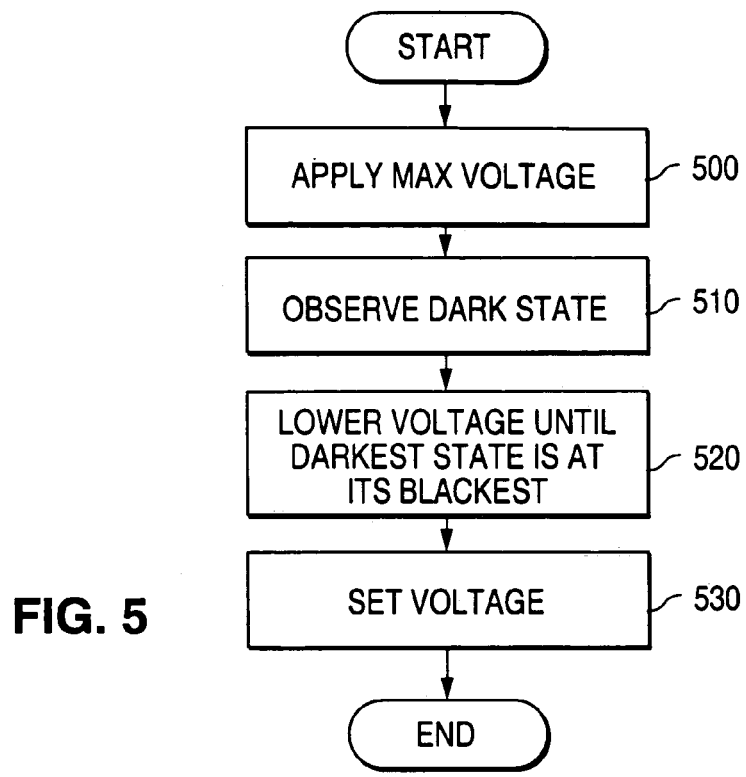
FIG. 5 is a flow chart of a black state adjustment process according to an embodiment of the present invention.

As part of a kernel quality control procedure a test image is projected. During this procedure, an amplitude of a Vdd voltage applied to each microdisplay is adjusted to produce the blackest possible dark state. In this case, the Vdd voltage is a voltage that determines the highest voltage that is applied to the liquid crystal layer and which thereby effects the max dark (or max black) state of the microdisplay. FIG. 5 is a flow chart of an embodiment of the dark state adjustment process.

At step 500, the maximum available voltage is applied to all three microdisplays. For example, a control unit 450, applies a maximum voltage to each microdisplay. The blackness of the dark state is then observed (step 510). The voltage amplitude is lowered on each channel individually until the blackest possible dark state is obtained (step 520). Feedback 460 is provided to the control unit to identify a max black state or local max black state. A local max black state is the darkest black state that can be achieved by adjusting just one of the microdisplays. Thus, the control unit adjusts the voltage amplitude applied to each microdisplay individually to a local black max and when the final voltage amplitude is adjusted a max black state is achieved. Feedback 460 may be provided by a sensitive light intensity meter placed in the output light path 470, or may be user provided input (e.g., from menu selections) based on observation of a screen that displays the output light path. The relationship between the light level reflected from the microdisplay and the applied voltage (voltage amplitude) is called an "S" curve. The voltage adjustment required to tune the residual retardation of the microdisplay affects the end point of the S curve. The shape of the S curve and the voltage required to produce any shade of gray is unchanged.

The step of lowering, or otherwise adjusting, the voltage amplitude applied to each microdisplay results in varying the residual retardation of the microdisplay to match the fixed compensating retardation of the waveplate. This process is suitable for high volume manufacturing environments.

Figure 6:
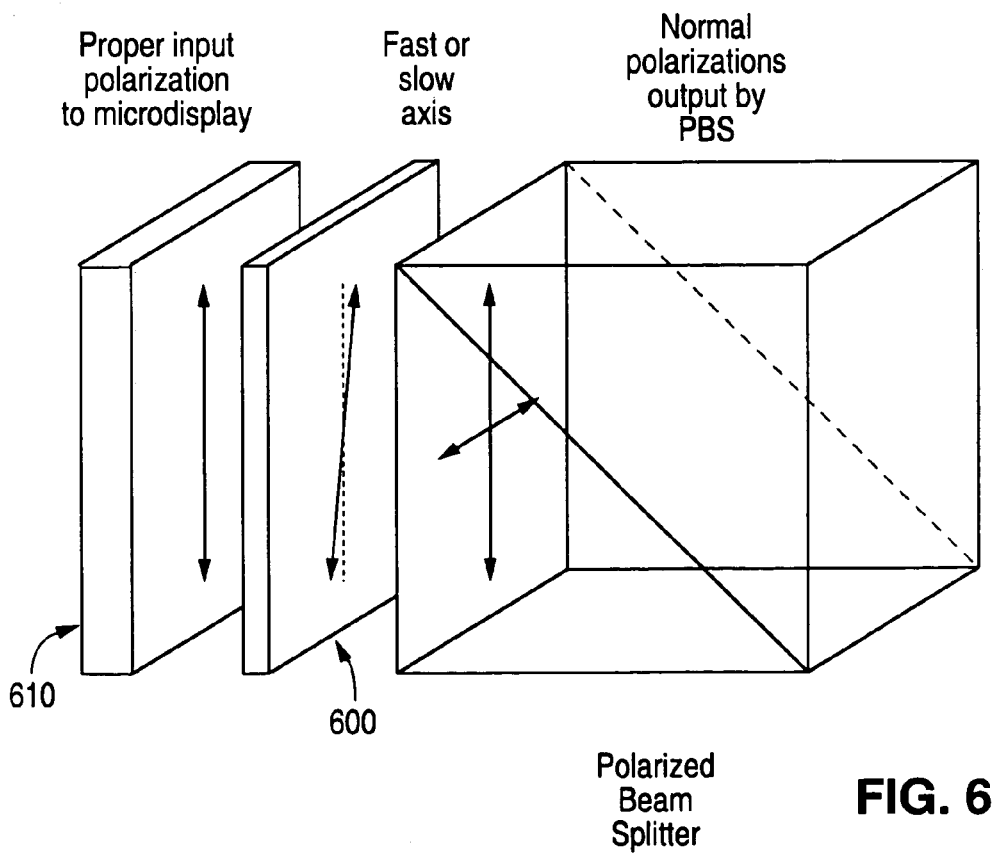
FIG. 6 is a drawing illustrating residual compensation in a conventional LCoS based prism assembly.

A conventional means of producing an image with the blackest possible dark state is to include a quarter waveplate between the mixed mode LCoS microdisplay and the prism assembly. The axes of the waveplate are typically adjusted to a small angle with respect to the direction of normally incident linearly polarized light that is input to the microdisplay. An example of a configuration utilizing a quarter waveplate 600 for the indicated purpose is illustrated in FIG. 6. The function of the waveplate 600 is to compensate the residual retardation that remains in the high voltage dark state of the microdisplay 610.

Figure 7:
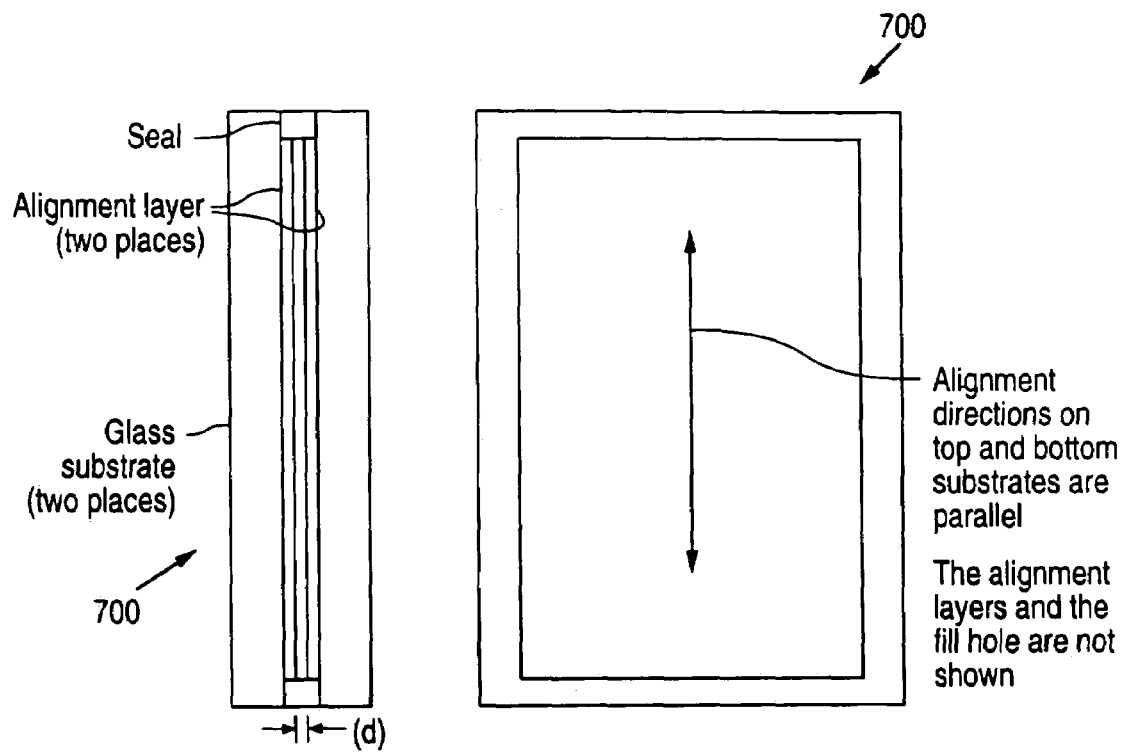
FIG. 7 is a drawing of a passive nematic cell according to an embodiment of the present invention.

The present invention also utilizes compensation of residual retardation via a cost effective quarter wave compensator that has high optical quality and that is also easy to manipulate during the process of producing LCoS prism assemblies in high volume. A quarter waveplate 700 according to an embodiment of the present invention is illustrated in FIG. 7. The waveplate 700 is a passive nematic liquid crystal device. That is, the cell does not include the internal transparent electrically conductive electrodes or external contact ledges found in conventional liquid crystal displays.

The nematic is homogeneously aligned. The rubbing directions on the top and bottom surfaces are parallel to each other. The thickness of the liquid crystal layer (d) (cell gap) is matched to the birefringence ($\Delta n$) of the nematic such that the retardation $d\Delta n = \frac{1}{4}\lambda$.

Note that the retardation is uniform across the entire visible portion of the cell area. In other words, the cell gap d is uniform. Note, however, that spacing elements, such as those used in liquid crystal displays, are not desirable within the viewing area of the passive cell.

In one embodiment, the present invention provides an LCoS prism assembly/kernel designed for the input of linearly polarized light. The linear polarized input light is fed into the prism assembly/kernel, separated into component light beams which are each instilled with a component part of an image, and the light beams are re-combined to produce an output image.

Figure 8:
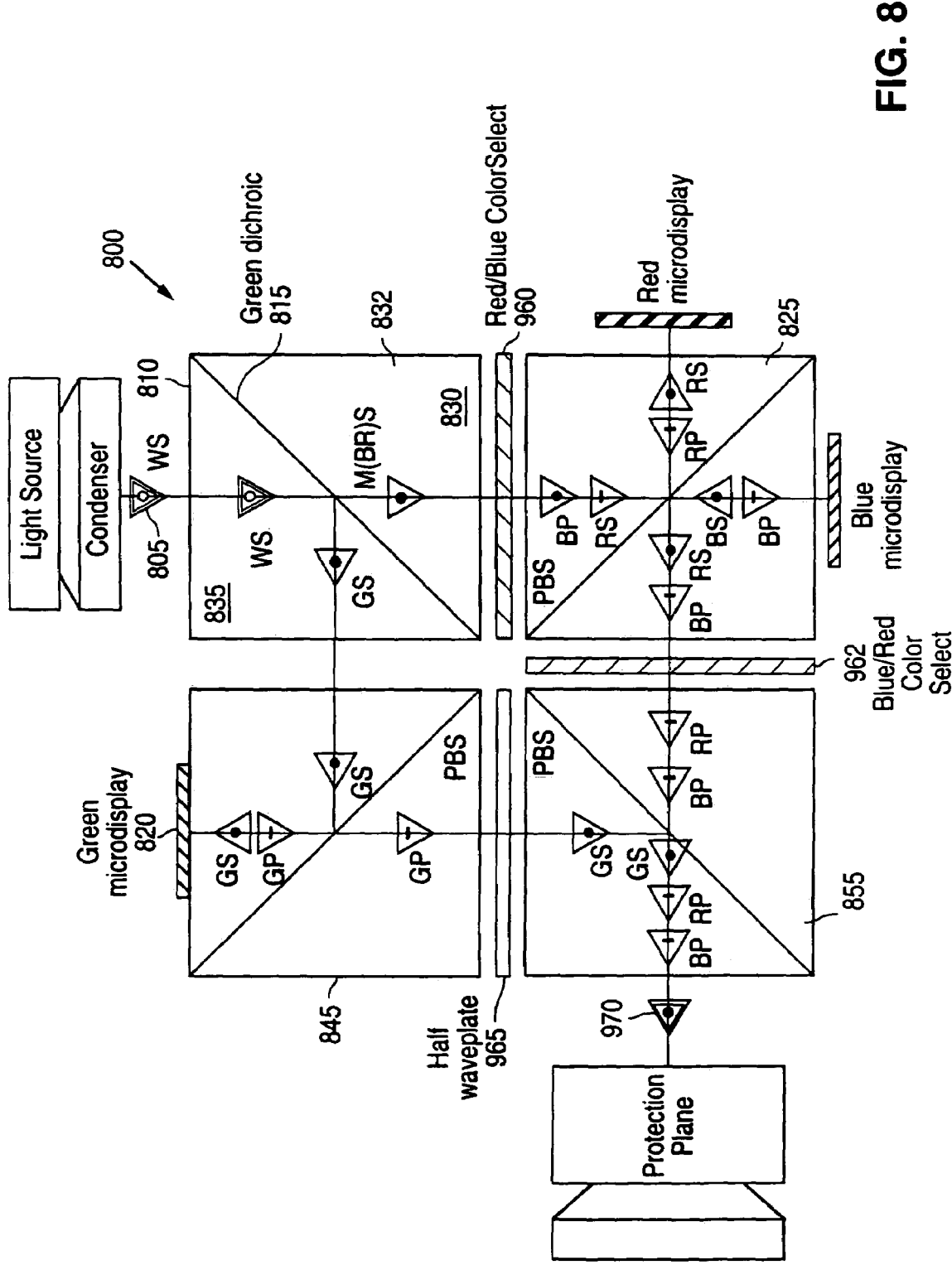
FIG. 8 is a drawing of an example of an LCoS kernel designed for the input of linearly polarized light according to an embodiment of the present invention.

FIG. 8 is a drawing of an example of an LCoS kernel 800 designed for the input of linearly polarized light according to an embodiment of the present invention. S polarized white light 805 enters the kernel at face 810. A green dichroic 815 reflects a green component of the input S polarized white light toward a green microdisplay 820, and a magenta (M) (Red and Blue) component of the input light passes through the green dichroic into PBS 825.

The green dichroic 815 may be arranged in the kernel 800 in a number of different embodiments, its main function being to properly separate the green component of the incoming light. In one embodiment, the dichroic is deposited between two triangular pieces as indicated in the drawing (e.g., between triangular piece 830 and 835, which, along with the dichroic comprise a beamsplitter).

PBSs 825, 845, and 855 are polarization sensitive beamsplitters that either pass or reflect polarized light as shown in the figure, or in other configurations that pass color light beams to correspondingly colored microdisplays where they are reflected and then directed to output 970. ColorSelect wavelength specific retarders 960/962 and half waveplate 965 convert polarizations of various light beams as indicated in the figure.

In another embodiment, the green dichroic can be deposited on one triangle with the other face left "open". In yet another embodiment, the green dichroic can be mounted on a flat plate or pellicle.

In yet another embodiment, the dichroic may be placed in a liquid filled prism as described in Berman et al. (II), Published Patent Application No. 20020001135, entitled "High Efficiency Prism Assembly for Image Projection," filed Jan. 3, 2002.

The techniques described herein may be utilized in any number of kernel configurations. In some configurations, a different dichroic is utilized.

Based on the present disclosure, it will be readily apparent to the ordinarily skilled artisan that by rearranging the optical components of the LCoS kernel 800, that the kernel may be modified to operate with input light that has a different polarization. For example, the kernel may be modified to utilize P polarized light instead of S polarized light.

Figure 9:
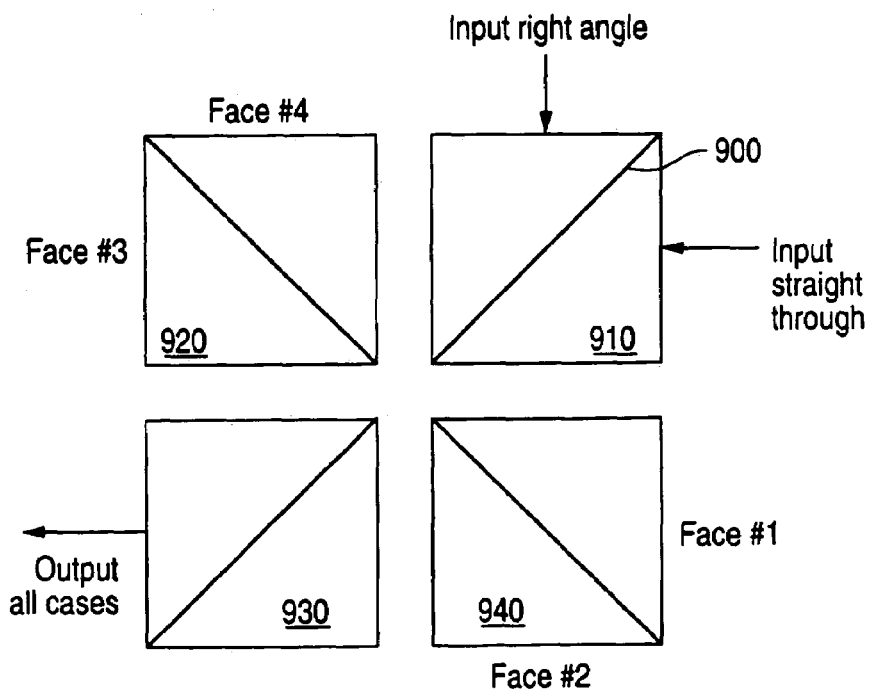
FIG. 9 is a diagram illustrating a naming convention for faces of a kernel.

Furthermore, whether P polarized, or S polarized input light is utilized as an input, many different arrangements of optical components may be utilized along with the techniques of the invention described herein to produce functionally equivalent kernels. For example, FIG. 9 is a diagram illustrating a naming convention for faces of a kernel, and FIG. 10 is a tabular listing of kernel configurations applicable to the present invention described using the naming conventions established in FIG. 9 as indicated in the figure.

More specifically, the kernel 800 matches the #8 kernel configuration of FIG. 10 (a right angle input and the microdisplays mounted on faces according to kernel configuration #8). In the example of FIG. 8, a green dichroic performs the initial beam separation (reflecting green polarized light) and passing magenta (red and blue) polarized light. More specifically, in FIG. 8, the green dichroic reflects green S polarized light and passes Magenta S polarized light.

As noted above, the green dichroic may also be sensitive so as to reflect P polarized input light, in which case additional modifications are needed to direct the light beams appropriately through the remaining portions of the kernel (on paths to and from the microdisplays and then finally through the output face). And, the dichroic may be configured to reflect colors other than green, and again, combined with another configuration of optical components and microdisplays to appropriately direct the separated light beams. For example, kernel configuration #27 is a straight through configuration having Blue, Green, and Red microdisplays mounted on Face #1, Face #2, and Face #3 respectively. In this example, a dichroic configured to pass red polarized light and reflect blue and green polarized light is affixed along diagonal 900. Again, depending on the arrangement of other components or optical elements within the kernel, the input light may be S polarized or P polarized light.

In another example, kernel configuration #4 is a right angle input configuration having Blue, Green, and Red microdisplays on Face #1, Face #2, and Face #4 respectively. In this example, a dichroic configured to reflect red polarized light and pass magenta (blue and green) polarized light is affixed to diagonal 900. The dichroic may be sensitive to various polarizations depending on the arrangement of other components and optical elements in the kernel (e.g., S or P polarized light).

Although the present invention is mainly described herein as applying to the quad style kernel based on the structure presented in FIG. 9, based on the present disclosure, it will be apparent to the ordinarily skilled artisan that the techniques and processes of the present invention applies to other kernel styles as well.

Any one or more of the kernels described herein may be arranged in a pathlength matched prism assembly as described in Berman et al,, U.S. application Ser. No. 10/202, 595, entitled: "Method and Apparatus for Configuration and assembly of a Video Projection Light Management System", filed Jul. 24, 2002, incorporated herein by reference (e.g., pathlengths 202A, 202B, and 202C, respectively, from the Green, Blue, and Red microdisplays to the output are matched). And, any one or more of the beam splitting cubes (e.g., 920, 930, and 940, or 825, 845, and 855) may be configured as a pathlength matched beam splitting cube constructed similarly as described in Detro, U.S. application Ser. No. 10/251,225, entitled: "Pathlength Matched Beam Splitter and Method and Apparatus for Assembly", filed Sept. 20, 2002, incorporated herein by reference. When the dichroic is affixed along diagonal 900 is affixed between two triangular pieces forming roughly a cube, then cube 910 may also be constructed according to techniques similar to those described in the referenced patent application. Use of a dichroic instead of a polarization sensitive thin film produces the dichroic beam separator as opposed to a polarization sensitive beam splitter (Polarizing Beam Splitter - PBS). As discussed above other methods of affixing the dichroic to the diagonal may be utilized (e.g., pellicle, flat plate, or one triangle leaving a face of the dichroic open).

Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. A quality control method comprising the steps of:
    producing a display device having at least one microdisplay; and
    setting a voltage amplitude on said at least one microdisplay to produce a highest black state of the display device, wherein:
    said at least one microdisplay comprises a set of microdisplay devices;
    said step of producing comprises producing a display device having a set of channels each comprising a light path for a specific band of light interacting with one of the microdisplay devices, each microdisplay device having a waveplate that compensates for residual retardation of the microdisplay; and
    said waveplate comprises a passive nematic cell.

2. The method according to claim 1, wherein the set of microdisplay devices comprise a set of Liquid Crystal On Silicon (LCOS) microdisplay devices.

3. The method according to claim 1, wherein the display device comprises a Liquid Crystal On Silicon (LCOS) video projection device.

4. A quality control method comprising the steps of:
    producing a display device having at least one microdisplay; and
    setting a voltage amplitude on said at least one microdisplay to produce a highest black state of the display device wherein:
    said display device comprises a kernel, comprising,
    an input face configured to receive input polarized light, and
    a beam separating dichroic arranged on a diagonal to the input polarized light and configured to separate the input polarized light into a first color beam and a second color beam.

5. The method according to claim 4, wherein said at least one microdisplay comprises a Liquid Crystal On Silicon (LCOS) microdisplay device.

6. The method according to claim 4, wherein said display device comprises a Liquid Crystal On Silicon (LCOS) video projection device.

7. A method of increasing the darkness of a black state of a microdisplay, comprising the steps of:
    applying a voltage to the microdisplay to invoke a black state;
    observing the black state;
    adjusting the voltage until the black state reaches its darkest point;
    setting a black state voltage to the applied voltage when the microdisplay reaches its darkest point.

8. The method according to claim 7, wherein the microdisplay comprises one of a red, green, and blue microdisplay in a kernel.

9. The method according to claim 8, wherein the steps of applying, observing, adjusting, and setting are applied to each of the red, green, and blue microdisplays in the kernel to determine a max black state of the kernel.

10. The method according to claim 7, wherein the method is applied to each microdisplay in a kernel to determine a max black state comprising a set of black state voltages, each black state voltage corresponding to a darkest point in one of the microdisplays.

11. The method according to claim 7, wherein the step of applying comprises applying a Vdd voltage to the microdisplay.

12. The method according to claim 7, wherein the black state voltage comprises a voltage less than a Vdd voltage of the microdisplay.

13. The method according to claim 7, wherein the microdisplay comprises a Liquid Crystal On Silicon (LCOS) microdisplay device.

14. The method according to claim 7, wherein the method is performed on microdisplays in a Liquid Crystal On Silicon (LCOS) video projection device.

15. The method according to claim 7, wherein the method is performed on microdisplays mounted on a prism assembly.

16. The method according to claim 7, wherein the microdisplays comprise Liquid Crystal On Silicon (LCOS) microdisplays.

17. A kernel, comprising:
a set of microdisplays;
a set of optics configured to divide input light into a set of primary colors and direct each primary color to one of the microdisplays for modulation; and
a control module configured to set an amount of modulation imposed on each primary color by its corresponding microdisplay;
wherein the control module includes a set of black state voltages, each black state voltage corresponding to a darkest point in one of the microdisplays, and each black state voltage is not a Vdd of its corresponding microdisplay.

18. The kernel according to claim 17, wherein each black state voltage is less than a Vdd of its corresponding microdisplay.

19. The kernel according to claim 17 wherein the set of black state voltages are obtained by adjusting a voltage applied to the microdisplay while observing an output screen displaying an output of the kernel.

20. The kernel according to claim 17, wherein the black state voltage is determined for each microdisplay by,
applying a maximum voltage to the microdisplay to invoke a black state;
observing the black state;
lowering the voltage until the black state reaches its darkest point; and
setting the black state voltage to the voltage when the microdisplay reaches its darkest point.

21. The kernel according to claim 17, further comprising a set of passive nematic based quarter waveplates each disposed between one of the microdisplay and the set of optics.

22. The kernel according to claim 17, further comprising a set of quarter waveplates cut such that the principle axes of each quarter waveplate are at an angle to sides of the quarter waveplates; wherein each quarter waveplate is disposed in a color light channel of the kernel.

23. The kernel according to claim 22, wherein the quarter waveplate is centered on a color wavelength of the color light channel in which it is disposed.

24. The kernel according to claim 17, wherein the microdisplays comprise Liquid Crystal On Silicon (LCOS) microdisplays.

25. The kernel according to claim 17, wherein the kernel is part of a Liquid Crystal On Silicon (LCOS) video projection device.

* * * * *